United States Patent
Strasser et al.

[19]

[11] Patent Number: 6,043,768

[45] Date of Patent: Mar. 28, 2000

[54] DEVICE AND METHOD FOR SWITCHING BETWEEN DIFFERENT OPERATING MODES OF A TRANSDUCER

[75] Inventors: Erich Strasser, Trostberg; Robert Wastlhuber, Garching/Alz; Hermann Hofbauer, Trostberg; Christian Zehentner, Teisendorf; Steffen Bielski, Garching/Alz; Helmut Huber, Garching/Wald a.d.Alz, all of Germany

[73] Assignee: Johannes Heidenhain GmbH, Traunreut, Germany

[21] Appl. No.: 08/797,048

[22] Filed: Feb. 10, 1997

[30] Foreign Application Priority Data

Feb. 16, 1996 [DE] Germany ............................ 196 05 763

[51] Int. Cl.[7] ............................... H03M 1/66; G11B 7/00
[52] U.S. Cl. ........................... 341/144; 369/43; 341/140; 73/634
[58] Field of Search ................................. 341/144; 369/43; 73/634

[56] References Cited

U.S. PATENT DOCUMENTS

| | | |
|---|---|---|
| 4,723,122 | 2/1988 | Maltby et al. . |
| 4,745,402 | 5/1988 | Auerbach ................................. 340/709 |
| 4,831,380 | 5/1989 | Gimblett . |
| 4,849,754 | 7/1989 | Maltby et al. . |
| 4,878,013 | 10/1989 | Andermo ................................... 324/61 |
| 5,008,843 | 4/1991 | Poelsler et al. . |
| 5,438,330 | 8/1995 | Yamazaki et al. . |

FOREIGN PATENT DOCUMENTS

| | | |
|---|---|---|
| 0 171 579 | 2/1986 | European Pat. Off. . |
| 0 324 967 | 7/1989 | European Pat. Off. . |
| 0 60 209 A1 | 6/1995 | European Pat. Off. . |
| 0 660 209 | 6/1995 | European Pat. Off. . |
| 31 42 468 A1 | 6/1982 | Germany . |
| 41 29 577 | 3/1993 | Germany . |
| 2218213 | 11/1989 | United Kingdom . |

*Primary Examiner*—Michael J. Tokar
*Assistant Examiner*—Peguy JeanPierre
*Attorney, Agent, or Firm*—Brinks Hofer Gilson & Lione

[57] ABSTRACT

A device and method for data transmission between a transducer and a processing unit which are coupled by one or several signal transmission lines, to selectively activate at least two different modes of operation of the transducer. The device includes a comparator unit which identifies the respectively activated mode of operation by comparing signals present on at least one signal transmission line with predetermined reference signals.

29 Claims, 3 Drawing Sheets

DEVICE AND METHOD FOR SWITCHING BETWEEN DIFFERENT OPERATING MODES OF A TRANSDUCER

FIELD OF THE INVENTION

The invention relates to a device and a method for switching between different modes of operation of a transducer. The device and the method in accordance with the invention are particularly suited to operations where a position measuring system is employed as the transducer.

BACKGROUND OF THE INVENTION

German Patent Publication No. DE 41 29 577 discloses a measuring system for detecting angles of rotation where it is possible to modify measuring system-specific data by the operator. The measuring system includes a data memory, which is connected by signal transmission lines with an evaluation unit. The measuring system can be programmed to be user-specific by the temporary connection of the measuring system outputs or the memory outputs with the transmission lines. A time-sequential multiplex method is proposed for the data transmission, which represents a relatively technically elaborate solution. The synchronization between the measuring system and the evaluation unit is furthermore not assured. In addition, the proposed interface is not universally usable with different measuring systems, for example, for measuring systems which already provide the actual measured value in the form of an absolute position and where the measured value of interest does not have to be generated in the evaluation unit downstream.

European Patent Publication No. EP 0 171 579 discloses a device as well as a method for synchronous-serial data transmission between a transducer and a processing unit. The proposed device includes a clock signal transmission line as well as a data signal transmission line through which the transducer and a downstream connected processing unit are connected with each other. The clock signal transmission line and data signal transmission line are only uni-directionally operated. User-specific programming of the transducer, for example, by writing/reading to or from memory units which are associated with the transducer is not provided or possible with this device.

For this reason it is suggested in European Patent Publication No. EP 0 660 209 to embody at least one signal transmission line between the transducer and the processing unit to be bi-directional and to assign the transducer a number of memory sectors. The user can write/read to or from the memory sectors by this signal transmission line so that it is possible for the user to adapt the processing unit to specific transducer parameters. The memory sectors can contain the most diverse parameters of the transducer, for example, information regarding its operational state, parameters of the processing unit, etc. Selective programming or measuring operation is possible with the aid of such a device. However, this advantageous solution requires certain prerequisites on the part of the transducer, in particular a bi-directional signal transmission line to the processing unit, and for this reason it cannot be universally employed, for example, in connection with transducers which have clock and data lines which can only be uni-directionally operated.

European Patent Publication No. EP 0 324 067 discloses another design of an interface between a transducer and a downstream arranged processing unit. Here, too, read/write memory units assigned to the transducer are provided in which characteristic transducer data are stored. This solution, like the previously described variant, can only be employed in connection with transducers designed for this and with a corresponding layout of the signal transmission lines.

Furthermore, U.S. Pat. No. 4,831,380 discloses an interface for transducers where the simultaneous transmission of transducer correction data and measured data to the processing unit takes place by way of the detection of a reference signal. However, there is no teaching of a programming of the transducer or switching between different operating modes of the transducer.

SUMMARY OF THE INVENTION

It is therefore an object of the present invention to provide a device as well as a method for switching between different operating modes of a transducer which dependably operates in connection with the greatest possible number of different transducer systems. It is intended, in particular, to make possible, besides the various measuring modes in which the transmission of measured data to a downstream connected processing unit is performed in different ways, the programming of the transducer by the respective user. Such a programming mode is intended, for example, to make possible an adaptation of the processing unit to defined parameters of the transducer with little effort.

Because of the use of a comparator unit, a dependable identification and subsequent switching to the desired transducer operating mode takes place. In this case its various operating modes can be provided, for example, different measuring modes, where signals of different form are transmitted to a downstream connected processing unit. Besides this, it is also possible to switch to an operating mode in which reading and writing of appropriate memory sectors of the transducer can take place.

The device or method of the present invention can be used with conventional interface variants with uni-directional signal transmission lines, such as described in European Patent Publication No. EP 0 171 579. On the other hand it is also possible to optimize devices or methods in accordance with European Patent Publication No. EP 0 171 579. Thus, the universal use in connection with the most diverse transducers is assured.

Within a programming mode it is possible to employ different known signal transmission methods, i.e. the device or method of the present invention can be designed to be extremely flexible in this regard. Furthermore, the device or method of the present invention can be employed in connection with the most diverse designs of transducers.

Furthermore, the result of another advantage of the device or method of the present invention is, that no separate connecting lines for activating the actual switching are required. The actual switching signals can be transmitted through the already present signal transmission lines. To accomplish this it is of course possible to employ the most diverse signal transmission lines, such as the data or clock signal transmission lines, for example.

Further advantages as well as details of the device and method of the present invention ensue from the following description of the preferred embodiments by way of the attached drawings.

DETAILED DESCRIPTION OF THE PRESENTLY PREFERRED EMBODIMENTS

Figure 1:
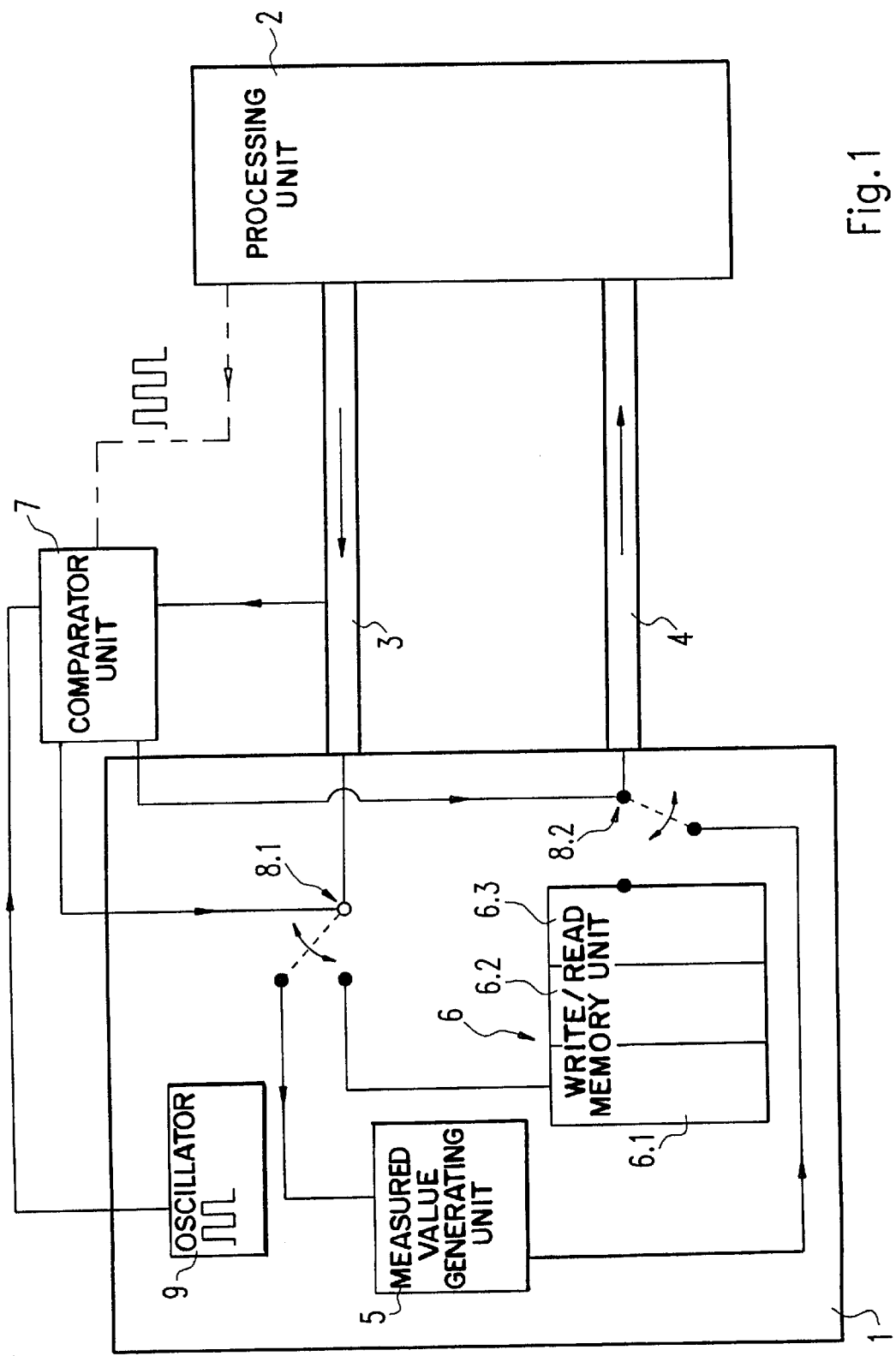
FIG. 1 is a block diagram of a first preferred embodiment of a device according to the present invention.

FIG. 1 is a block diagram of a first preferred embodiment of a device according to the present invention. The device includes a transducer 1, a processing unit 2, signal transmission lines 3 and 4 and a comparator unit 7. The transducer 1 includes a measured value generating unit 5, memory module 6, switches 8.1 and 8.2 and oscillator 9. In a preferred embodiment, the device is a position measuring system and, more preferably, is an absolute angle measuring system. The transducer 1 is connected to a downstream evaluation or processing unit 2 by preferably two uni-directionally operated signal transmission lines 3 and 4. In a more preferred embodiment where the device is an absolute angle measuring system, the processing unit 2 corresponds to a conventional machine tool control, for example.

The transducer 1 is designed in a known manner for detecting the absolute angle position which is of interest, i.e. it is possible by using photoelectrical scanning of a code disk or several code disks, connected with each other by a reducing gear, to generate analog scanning signals. The scanning signals are amplified in a scanning unit and converted into digital signals in the form of a binary data word which indicates the absolute angle position. The individual components for generating the position data which are to be transmitted are not shown in detail in FIG. 1, instead, the reference numeral 5 indicates the totality of the individual elements of the measured value generating unit 5 such as that disclosed in U.S. Pat. No. 5,438,330 which is specifically incorporated herewith. A binary data word which indicates the absolute angle position, is output by the measured value generating unit 5. The selected schematic representation of the measured value generating unit 5 is intended to be illustrative and not limiting. Any device or method for generating measured values can be used in connection with the present invention.

Transmission of the signals from the measured value generating unit 5 by the two signal transmission lines 3 and 4 to the downstream processing unit 2 is performed in a known manner, for example, by use of a measurement mode which is described by way of example in European Patent Publication No. EP 0 171 579. Using such a measurement mode, the two signal transmission lines 3 and 4 are uni-directionally operated. In particular, signal transmission line 3 is preferably a clock line transmitting signals from the processing unit 2 to the transducer 1 and signal transmission line 4 is preferably a data line transmitting data from the transducer 1 to the processing unit 2. By transmitting defined clock signals from the processing unit 2 via the clock line 3 to the measured value generating unit 5, the serial transmission of measured data on the data line 4 in the direction toward the processing unit 2 is appropriately synchronized.

The memory module 6 of the transducer 1 preferably includes several separate memory sectors 6.1, 6.2 and 6.3. The individual memory sectors 6.1, 6.2 and 6.3 are preferably reserved for different parameter categories although they need not be. The memory sectors 6.1, 6.2, and 6.3 can be read in and read out from in a programming mode in a defined manner by the respective user. As stated in detail in European Patent Publication No. EP 0 660 209, it is possible to store user-specific parameters as well as specific data of the transducer manufacturer, correction data of the transducer 1, mode of operation parameters, etc. in the individual memory sectors 6.1, 6.2 and 6.3. In the preferred embodiment illustrated it is possible to realize a programming mode or make it available to the user instead of solely providing a measurement mode in which a measured data transmission to the processing unit 2 takes place. For example, in programming mode it is possible to preset the mode of operation of the transducer 1, for example, for indicating the direction of rotation of an angle measuring system, or read-out the parameters of the transducer manufacturer.

In order to provide a programming mode in the preferred embodiment shown in FIG. 1 using uni-directional transmission lines 3 and 4, a comparator unit 7 is provided. It is the task of the comparator unit 7 to continuously detect the signals which are transmitted over at least one of the two signal transmission lines 3, 4. The detected signals are continuously compared by the comparator unit 7 with preset reference signals so that an identification of the respectively activated or desired mode of operation is possible. Depending on the type of signal transmitted by the processing unit 2, the comparator unit 7 detects the desired mode of operation selected by the user by comparing the transmitted signal with a reference signal and activates the switches 8.1 and 8.2 appropriately in order to switch between at least two modes of operation. As a function of the number of modes of operation provided, a different number of reference signals or types of reference signals may be necessary. If there are only two desired modes of operation, however, a single reference signal is sufficient. When the comparator unit 7 recognizes the signal transmitted by the processing unit 2 as one to change the mode of operation of the device 1, a switch to respectively the other of the two modes of operation is made. More particularly, if a programming mode is selected, switch 8.1 connects clock line 3 and data line 4 to memory module 6 instead of measured value generating unit 5 as illustrated.

Furthermore other signal transmission lines can of course also be used to provide switching between the various modes of operation in the described manner and the present invention is not limited to the particular embodiments illustrated.

The processing unit 2 is provided with a suitable interface, for example a keyboard, to allow the user to select the mode of operation required at a specific time. In a preferred embodiment the processing unit 2 also has a display unit (not shown). In a preferred embodiment, prior to the first use, the transducer will be operated in the programming mode before it is used in the measuring mode in order to change, read out, etc. the memory sectors 6.1, 6.2, 6.3. After certain parameters have been read out the measuring mode of the transducer will be activated. In the same way it is also possible to read out error data from the memory sectors in the programming mode. If certain transducer errors occur during the measurement mode then error data is stored in the memory which can be read out for failure diagnosis and analysis.

In a preferred embodiment of the device and method of the present invention it is, for example, possible to operate the transducer 1 in such a way that subsequent to turning on the device, the device is automatically in programming mode and the user performs the desired programming of the transducer 1. At the end of programming, a switch is made to the measuring mode where again the comparator unit 7 identifies the subsequently desired mode of operation by comparing the signal transmitted by the processing unit 2 to a reference signal and activates the switches 8.1 and 8.2 to properly implement the selected mode of operation.

In the preferred embodiment illustrated in FIG. 1 the comparator unit 7 is designed in such a way that the detection of the transmitted signal frequency on at least one signal transmission line 3 is possible. Accordingly, a reference signal having a reference frequency is therefore provided with which the actually detected transmitted signal is compared. In the preferred embodiment illustrated in FIG. 1, the comparator unit 7 monitors the signals on the clock signal transmission line 3 and compares them with a reference signal. If the comparator unit 7 detects by monitoring the signal frequency of the transmitted signal that synchronization signals are no longer being transmitted on the clock signal transmission line 3, the comparator unit 7 activates the suitably designed switches 8.1 and 8.2 through which a switch to the programming mode is implemented. The comparator may be incorporated into either the transducer or processing unit or it may be separately located from either.

For example, it is possible to preset a reference signal having a reference frequency for identifying the mode of operation. If the detected frequency differs by a set amount from the reference frequency, a switch to the respectively other mode of operation is performed. In this way it is of course possible to preset more than two different modes of operation. In the same way is it possible to also perform the identification of the respective mode of operation alternatively to the described frequency range of the detected signals. Thus, it is possible, for example, to generate a switching signal on a signal transmission line in response to a change in resistance or load on the side of the processing unit 2. Such a change brings about a corresponding change in the d.c. level or the d.c. voltage level which is detected on the signal transmission line by the comparator unit and a mode of operation of the transducer associated with the changed level is identified or activated. A return to the original mode of operation can accordingly take place by switching off such a resistance or load from the signal transmission line. It is of course possible to also identify or activate several different modes of operation in a similar manner.

After a desired change of the mode of operation has been detected, the clock signal transmission line 3 and the data signal transmission line 4 are subsequently switched so that the processing unit 2 can write and/or read to or from the memory sectors 6.1, 6.2 and 6.3 of the memory module 6. While switches 8.1 and 8.2 have been illustrated schematically in the form of switches in FIG. 1, it is of course possible to realize these elements of the device of the present invention as well as other components to be explained later using software and/or hardware. FIG. 1 is shown to merely illustrate the basic signal processing inside the device and method of the present invention.

The reference signal required for the comparator unit 7 is generated by oscillator stage 9. Alternatively, a reference signal may be generated externally by the processing unit 2 as indicated in FIG. 1 by the dashed line connecting the processing unit 2 to the comparator 7.

In these preferred embodiments according to the present invention a defined switching between the various modes of operation of the transducer by the user from the processing unit 2 is made possible. The comparator unit 7 identifies the desired mode of operation by a comparison of the signal transmitted by the processing unit 2 with a reference signal and activates the switches 8.1 and 8.2, which then cause the required changes to implement the change in mode of operation.

The data transfer required for a programming mode on the clock signal transmission line 3 between the processing unit 2 and the transducer 1 or the memory module 6 takes place in a known manner by suitable encrypting or coding of the transmitted signals. Known modulation processes, such as pulse code, pulse phase or frequency modulation processes etc. may be used. For example, in the case of frequency modulation of the transmitted signals in the programming mode, the signal transmission can take place in the direction of the transducer preferably in a frequency range between about 1.5 MHz to about 3 MHz. Of course other frequency ranges may be used.

Figure 2:
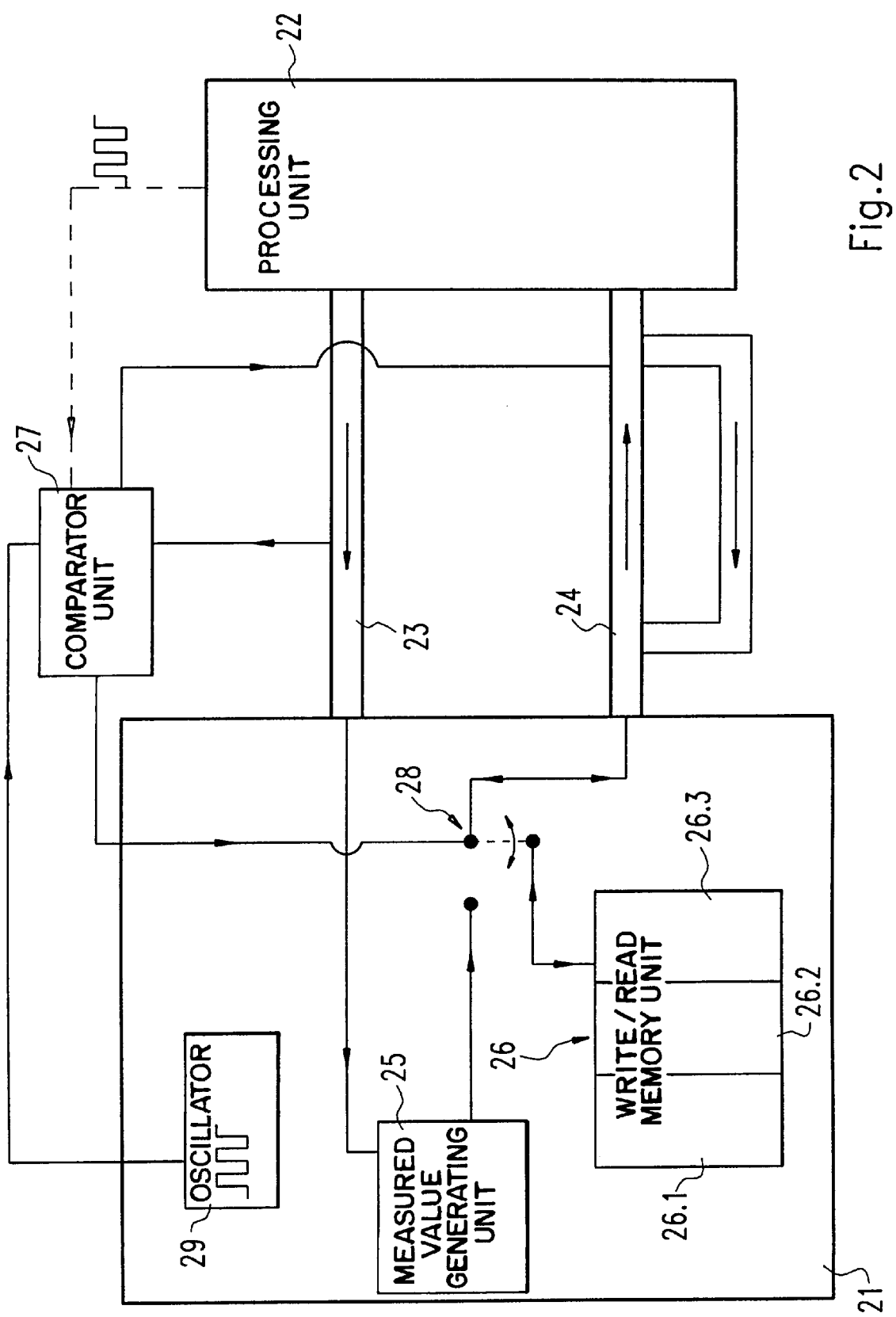
FIG. 2 is a block diagram of a second preferred embodiment of a device according to the present invention.

FIG. 2 is a block diagram of a second preferred embodiment of a device according to the present invention. Like elements will be given the same reference numbers as in FIG. 1 with the addition of the prefix "2." Again, a transducer 21 as well as a downstream connected processing unit 22 are illustrated which are connected with each other by signal transmission lines 23 and 24. The transducer 21 is again preferably embodied as an absolute position measuring system and in its basic structure corresponds to the previously described preferred embodiment shown in FIG. 1. The transducer 21 includes a measurement value generating unit 25 as well as a memory module 26 with different memory sectors 26.1, 26.2, 26.3. Also, a comparator unit 27 is furthermore disposed in the device which assures definite switching between the various modes of operation where the activated mode of operation is identified by comparing the signals present in at least one signal transmission line 23 with a reference signal.

In contrast to the preferred embodiment shown in FIG. 1, one of the two signal transmission lines 24 is embodied as a signal transmission line 24 which can be bi-directionally operated. As soon as the comparator unit 27 detects that the signals present in one of the two signal transmission lines 23 differ from a preset reference signal, a switch 28 is activated thereby connecting the processing unit 22 and the write/read memory module 26 inside the transducer 21 which allows user-specific programming of the memory module 26 or writing and reading of the different memory sectors 62.1, 62.2 and 62.3 by way of the bi-directionally operating signal transmission line 24.

As was previously described with respect to the preferred embodiment shown in FIG. 1, a reference signal for the comparator unit 27 is generated by oscillator stage 29 which is associated with the transducer 21. Alternatively an external reference signal may be supplied from the processing unit 22 as indicated by the dashed line.

With this preferred embodiment in particular it should be noted that there are a number of possibilities of designing the schematically represented comparator unit 27 as well as the switch 28 using hardware and/or software. The schematic block diagram of FIG. 2 is merely intended to explain the functional cooperation in accordance with a preferred embodiment of the present invention which makes the various modes of operation of the transducer possible.

Figure 3:
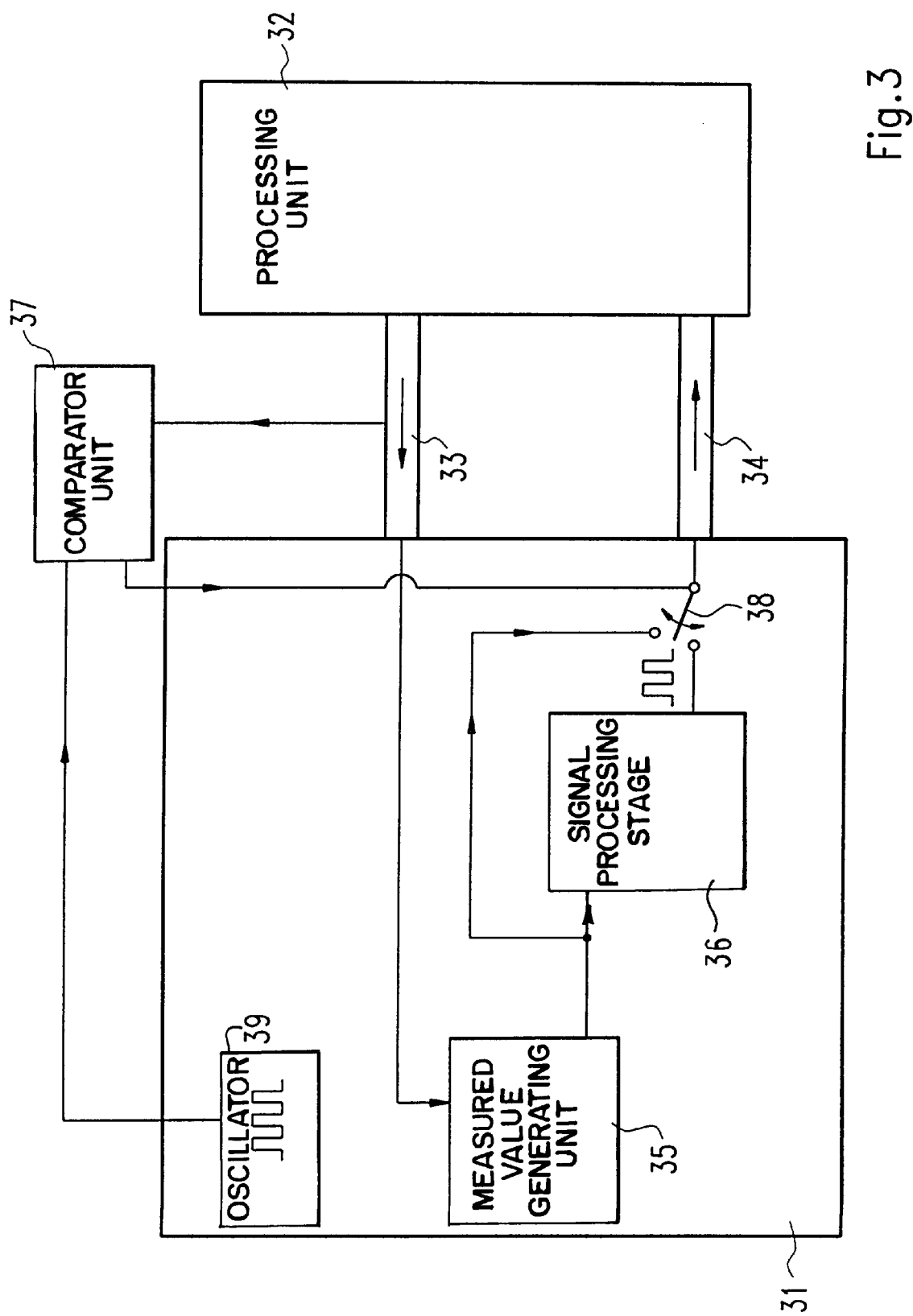
FIG. 3 is a block diagram of a third preferred embodiment of a device according to the present invention.

FIG. 3 is a block diagram of a third preferred embodiment of the device according to the present invention. Like elements will be given the same reference numbers as in FIG. 1 with the addition of the prefix "3." While in the previously described preferred embodiments switching between a measuring mode and programming mode of a transducer took place, in this preferred embodiment switching between various measuring modes of the transducer 31 is possible. The two measuring modes here differ in the form of the signals transmitted to the downstream connected evaluation or processing unit 32. In a first preferred measuring mode, analog signals are transmitted, while in a second preferred measuring mode, the transmission of digital signals takes place. Such a switching option between different output signals of a transducer 31 designed as a position measuring device has been shown to be advantageous for error diagnosis, for example, if for this purpose it is possible to switch from customarily rectangular output signals to analog scanning signals. These can then be analyzed in a processing unit 32 to diagnose possibly present error functions of the transducer 31.

It is of course possible to combine the mentioned steps, depending on the requirements, i.e. in accordance with the present invention it is also possible to provide switching between different measuring modes as well as between measuring modes and programming modes, etc.

In the preferred embodiment of FIG. 3, a measuring value generating unit 35 is provided in the transducer 31 which, for example, is again embodied as a position measuring device. Analog scanning signals can be generated by the generating unit by means of photoelectric scanning of one or several code disks, which are used for the absolute position determination of two objects which are movable in respect to each other. In principle, the measuring value generating unit 35 can also be differently designed, for example, for incremental position determination by means of photoelectric or magnetic scanning of a periodic scale graduation, etc. As a result, analog signals are generated via the measuring value generating unit which reach a signal processing stage 36 inside the transducer 31. The processing stage 36 is used to convert the analog signals into digital signals, for example. The digital output signals are transmitted via a signal transmission line 34 to the downstream connected processing unit 32. Besides the signal transmission line 34 for transmitting the data to the following processing unit, a further signal transmission line 34 is provided through which, analogously to the first preferred embodiment, the transmission of clock signals to the measuring value generating unit 35 takes place in order to suitably synchronize the data transfer.

In accordance with a preferred embodiment of the present invention, in addition to a first measuring mode, in which digital output signals are transmitted to the processing unit 32, at least one second measuring mode of the transducer 31 is provided which allows the transmission of analog scanning signals to the processing unit 32. The appropriate analog signals between the measuring value generating unit 35 and the signal processing stage 36 are tapped for this. A suitable switching means 38 is arranged between the signal transmission line 34 and the two signal lines on the side of the transducer 31 in which analog or digital signals are present so that a selection can be made between analog or digital signals which are transmitted to the processing unit 32.

The corresponding switch between the different measuring modes takes place in an analogous manner to the preferred embodiments already described. A comparator unit 37 is provided which is designed in such a way that detection of the signal frequency present on the second signal transmission line 33 is possible. The signal frequency of the signal transmitted on the second signal transmission line is compared with a reference signal, which is generated by an oscillator stage 39 which is assigned to the transducer 31. Again, a definite reference frequency is assigned to each of the two measuring modes, so that when such a reference frequency has been detected, it is possible to switch to the appropriate measuring mode through the switching means 38.

Thus, with respect to all of the preferred embodiments described, no separate connecting lines between the processing unit 32 and the transducer 31 are required in order to perform the desired switch between different modes of operation. The preferred embodiments represented in FIGS. 1–3 illustrate possible variants of transducers in which such switching is possible, however, other transducers that are suitably modified may be used.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A device for data transmission between a transducer and a processing unit which are coupled to each other through one or several signal transmission lines, the device comprising:

a comparator unit coupled to the transducer and processing unit and receiving signals from the processing unit wherein the comparator identifies an active mode of operation of the transducer by comparing signals present in at least one signal transmission line with predetermined reference signals, wherein the transducer can be selectively operated in at least two different modes of operation, among which is at least one measuring mode as well as at least one programming mode.

2. The device according to claim 1 wherein a first signal transmission line is provided for data transmission and a second signal transmission line is provided for the transmission of a clock signal.

3. The device according to claim 1 further comprising switching means connected with the comparator unit which can be activated, depending on the identified active mode of operation, either to write to or read from memory sectors of a memory module assigned to the transducer or to transmit measured data to the processing unit.

4. The device according to claim 1 wherein the comparator unit is designed such that the detection of the signal frequency present on at least one signal transmission line is possible.

5. The device according to claim 4 wherein the reference signal can be generated by an oscillator stage in the transducer.

6. The device according to claim 1 wherein the predetermined reference signal is in the form of a definite reference frequency signal sequence.

7. The device according to claim 6 wherein the reference signal can be externally generated and is supplied to the comparator unit by a further signal transmission line.

8. The device according to claim 1 wherein the transmission of signals in the programming mode takes place by a uni-directionally operated clock signal line.

9. The device according to claim 1 wherein the transmission of signals in the programming mode takes place by a bi-directionally operable data line.

10. The device according to claim 1 wherein the transducer further comprises a signal processing stage which converts analog signals into digital output signals and has switching means which allow switching between different measuring modes, one of which provides a transmission of the analog signals to the downstream connected processing unit, while the other provides a transmission of the digital output signals generated by the signal processing stage to the downstream connected processing unit.

11. A method for the data transmission between a transducer and a processing unit, which are coupled with each other through one or several signal transmission lines, the method comprising the steps of:

selectively activating at least two different modes of operation of the transducer by comparing signals present on at least one signal transmission line with predetermined reference signals.

12. The method according to claim 11 wherein the at least two different modes of operation of the transducer include a measuring mode and a programming mode.

13. The method according to claim 12 wherein the transmission of signals in the programming mode is performed by means of a coding method.

14. The method according to claim 11 wherein the signal frequency of the signals present on at least one signal transmission line is continuously detected for comparison purposes.

15. The method according to claim 14 wherein the frequency of the signals present on a signal transmission line is compared with a reference frequency.

16. The method according to claim 11 wherein, depending on the identified mode of operation, switching means are activated for either writing/reading associated memory sectors of a memory module or to transmit measured data to the processing unit.

17. The method according to claim 11 wherein a switch between at least two measuring modes of the transducer is possible, wherein in a first measuring mode the transmission of analog signals to a downstream located processing unit takes place, and in a second measuring mode a transmission of digital signals to the downstream located processing unit takes place.

18. A device for data transmission between a transducer and a processing unit that are coupled to each other through at least two transmission lines, wherein the transducer can be selectively operated in at least two different modes of operation, the device comprising:

a comparator unit coupled to the transducer and the processing unit wherein the comparator unit receives clock signals from the processing unit which are transmitted via a clock transmitting line, wherein the clock signals are used to synchronize data transmission on a data transmission line, the comparator unit identifies a switching signal having a frequency different from the frequency of the clock signal and generates an activating signal, wherein the activating signal is dependent on the identified switching signal; and a switching unit having different modes of operation, wherein the switching unit receives the activation signal and changes the mode of operation of the transducer dependent on the received activation signal.

19. A device according to claim 18 wherein at least two different modes of operation include at least one measuring mode as well as at least one programming mode.

20. A device according to claim 19 wherein the switching unit can be activated, depending on the identified active mode of operation, either to write to or read from memory sectors of a memory module assigned to the transducer or to transmit measured data to the processing unit.

21. A method for data transmission between a transducer and a processing unit that are coupled to each other through at least two transmission lines, wherein the transducer can be selectively operated in at least two different modes of operation, the method comprising the steps of:

transmitting clock signals to a comparator unit;

synchronizing data transmission on a data transmission line with the clock signals;

identifying a switching signal having a frequency different from the frequency of the clock signal;

generating an activating signal wherein the activating signal is dependent on the identified switching signal; and changing the mode of operation of the transducer depending on the generated activating signal.

22. The method of claim 21 wherein the at least two modes of operation of the transducer include a measuring mode and a programming mode.

23. The method of claim 21 further comprising the step of, depending on the identified mode of operation, switching from either writing/reading associated memory sectors of a memory module or transmitting measured data to the processing unit.

24. A device for data transmission between a transducer and a processing unit which are coupled to each other through one or several signal transmission lines, the device comprising:

a comparator unit coupled to the transducer and processing unit and receiving signals from the processing unit wherein the comparator identifies an active mode of operation of the transducer by comparing signals present in at least one signal transmission line with predetermined reference signals, wherein the comparator unit is designed to detect the signal frequency present on at least one signal transmission line.

25. The device according to claim 24 wherein the predetermined reference signal is in the form of a definite reference frequency signal sequence.

26. The device according to claim 25 wherein the reference signal can be externally generated and is supplied to the comparator unit by a further signal transmission line.

27. The device according to claim 24 wherein the reference signal can be generated by an oscillator stage in the transducer.

28. A device for data transmission between a transducer and a processing unit which are coupled to each other through one or several signal transmission lines, the device comprising:

a comparator unit coupled to the transducer and processing unit and receiving signals from the processing unit wherein the comparator identifies an active mode of operation of the transducer by comparing signals present in at least one signal transmission line with predetermined reference signals, wherein the transducer further comprises a signal processing stage which converts analog signals into digital output signals and has switching means which allow switching between different measuring modes, one of which provides a transmission of the analog signals to the downstream connected processing unit, while the other provides a transmission of the digital output signals generated by the signal processing stage to the downstream connected processing unit.

29. The device according to claim 28 wherein the transducer is a position measuring system.

* * * * *

UNITED STATES PATENT AND TRADEMARK OFFICE
CERTIFICATE OF CORRECTION

PATENT NO. : 6,043,768
DATED : March 28, 2000
INVENTOR(S) : Erich Strasser et al.

It is certified that error appears in the above-identified patent and that said Letters Patent is hereby corrected as shown below:

Title page,
Column 2,
After line 7, under "FOREIGN PATENT DOCUMENTS", insert the following:

-- OTHER PUBLICATIONS

Link, W., "Messen, Stevern und Regeln mit PC's,"
pp. 52-81 and 120-125 (1989). --.

Signed and Sealed this

Eleventh Day of December, 2001

*Attest:*

NICHOLAS P. GODICI
*Attesting Officer*   *Acting Director of the United States Patent and Trademark Office*